United States Patent [19]
Blumenthal et al.

[11] Patent Number: 5,784,460
[45] Date of Patent: Jul. 21, 1998

[54] SECURED ELECTRONIC INFORMATION DELIVERY SYSTEM HAVING A THREE-TIER STRUCTURE

[75] Inventors: Michael S. Blumenthal, Hauppauge, N.Y.; Daniel J. Barthel, Seattle, Wash.; Bruce Newman, St. James; Brenda S. Newman, Lake Grove, both of N.Y.

[73] Assignee: ProtoCall Technolgies, Inc., Commack, N.Y.

[21] Appl. No.: 720,968

[22] Filed: Oct. 10, 1996

[51] Int. Cl.$^6$ ............................................. H04L 9/00
[52] U.S. Cl. ............................ 380/4; 380/25; 380/21
[58] Field of Search ................................. 380/4, 25, 21

[56] References Cited

U.S. PATENT DOCUMENTS

| | | | |
|---|---|---|---|
| 5,319,705 | 6/1994 | Halter et al. | 380/4 |
| 5,394,469 | 2/1995 | Nagel et al. | 380/4 |
| 5,555,304 | 9/1996 | Hasebe et al. | 380/4 |
| 5,586,186 | 12/1996 | Yuval et al. | 380/4 |

OTHER PUBLICATIONS

Manual, *Type On Site*, Mar. 1993, pp. 1–8.
Manual, *Type On Site*, Jul. 1992, pp. 1–8.

*Primary Examiner*—Thomas H. Tarcza
*Assistant Examiner*—Carmen D. White
*Attorney, Agent, or Firm*—Meltzer, Lippe, Goldstein et al.

[57] ABSTRACT

A system is provided for retrieving a selected one of a plurality of encrypted software products stored in at least one storage device, such as a CD-ROM. Each software product is decryptable by a unique decryption key. The CD-ROM storage device is coupled to a end-user station having a unique serial number and a processor that is responsive to an application program stored therein. The user can select a software product to decrypt upon receipt of the corresponding decryption key. A remote vender station, having a unique password, is selectively coupled to the end-user station, via a network, to receive a request for the decryption key corresponding to the selected software product. Further, the vender station receives the serial number from the end-user station. A remote server is connected to the vender station, via a network, when the password transmitted from the vender station is validated. The server receives a request for the decryption key corresponding to the transmitted selected software product and the end-user serial number. The server then generates and transmits the decryption key to the vender station based on the selected software product and the serial number. Thereafter, the vender station transmits the decryption key to the end-user station, so that the end-user application program can decrypt the selected software product based on the received decryption key.

20 Claims, 13 Drawing Sheets

SECURED ELECTRONIC INFORMATION DELIVERY SYSTEM HAVING A THREE-TIER STRUCTURE

RELATED APPLICATIONS

U.S. patent application Ser. No. 08/731,185 entitled "Secured Electronic Information Delivery System Having a Metering Device," was filed on Oct. 10, 1996 for Daniel J. Barthel et al. and U.S. patent application Ser. No. 08/731, 186 entitled "Secured Electronic Information Delivery System Having a Separate Data Management," was filed on Oct. 10, 1996 for Daniel J. Barthel et al. The above-noted applications are assigned to the assignee of this application. The contents of the above-noted applications are relevant to the subject matter of this application and are fully incorporated herein by reference.

FIELD OF THE INVENTION

The invention relates generally to a system for retrieving secured data from a storage device and, more particularly, to a three-tier system having a end-user station selectively connectable to a vender station for requesting decryption keys, generated by a remote server, to retrieve secured data from a storage device.

BACKGROUND OF THE INVENTION

Traditional methods of product distribution within the retail software business generally involve the retailer having to purchase up-front inventories of each product before actual market demand can be determined. Moreover, retailers inevitably face the "80/20" rule—unless you have the 80% of inventory in stock which rarely sells, you won't have the opportunity to sell the 20% which does sell frequently. The only alternative previously available to retailers was to arrange a consignment inventory with the supplier. Consignment, however, does not resolve "out-of-stock" items, space requirements, or inventory management issues. Consignment inventory also bears a large up-front cost for suppliers.

These factors, combined with increased competition from superstores, declining retail prices, and the perceived threat of the Internet as a convenient mechanism to purchase a wide assortment of software products, make traditional methods of software distribution highly inefficient in today's market environment. Therefore, there is a need for retailers to be able to produce software products "on-demand" as the items are needed. One such solution is a system for retrieving secured data from storage device.

In a conventional system for retrieving secured data from a storage device, the storage device may be located remotely from the retailer's user station over, e.g., a local area network (LAN) or a wide area network (WAN) or be located at the user station from, e.g., a CD-ROM.

In systems where the storage device is at the user station, the user's access to the secured data from the storage device needs to be regulated. For example, in a hardware based system developed by Infosafe Systems, Inc., such regulation is accomplished by a metering chip that comprises all of the decryption keys to unlock the desired secured data from a CD-ROM. Essentially, a SCSI (small computer system interface) device, acting as an external hard drive and connected to the user station, includes the metering chip having the decryption keys. The selected secured data is decrypted with a corresponding decryption key, while the user's order is simultaneously written and stored in the flash memory of the SCSI device. However, for the distributor to monitor each user station's usage (for billing purposes), every user station must be polled on a regular bases, e.g., daily, to capture the data stored in each SCSI device and subsequently purge the flash memory. This system has the disadvantage in that the distributor must poll each user station having the metering chip which is extremely time consuming, if not unrealistic, when the amount of user stations are in the thousands.

In another hardware based system by Wave Systems Corp., another metering chip that comprises all of the decryption keys to unlock the desired secured data from a CD-ROM has been developed. However, unlike the system by Infosafe, the metering chip is not located in an external SCSI device but in the motherboard of the user station. This system has the same disadvantage in that the distributor must poll each user station having the metering chip. Further, any PC or Macintosh based user station would require that the motherboard be manufactured with the metering chip. This has the inherent disadvantages of taking up valuable real estate, i.e. space, on the motherboard, adding a significant cost to new computers, and difficult to service if there is a problem with the chip.

In another secured data delivery system, developed by the assignee of this application, a combined hardware and software system has been produced. In this system, a retailer is supplied with a CD-ROM having encrypted software products stored thereon, and an application program (hereinafter an "Application") including the product information corresponding to the encrypted software products and a decryption algorithm capable of taking partial decryption keys, supplied transparently from a remote server, to generate corresponding full decryption keys to decrypt the selected software products from the CD-ROM.

However, in this system, since product data information is encrypted and incorporated into the Application program, a new Application is needed any time there is a change to the available products or when additional products or manufacturers are offered. Further, the Application risks becoming "bloated" with data and would require more memory to run as the number of products and manufacturers increases with time. Additionally, this system does not contemplate having a retailer sell CD-ROMs and Application software to customers, while being able to monitor the consumer's use by having the user connect to the retailer for decryption keys. Furthermore, this system requires that the retailer contact the server to receive the decryption keys every time the retailer produces a software product.

It is therefore an object of the present invention to overcome the disadvantages of the prior art.

SUMMARY OF THE INVENTION

This and other objects are realized by an inventive system and method of retrieving secured electronic information stored in at least one storage device, where each storage device is at least partially encrypted and is coupled to a user station. The user station may be used by a retailer, a consumer, and the like.

In one embodiment, each user station is coupled to at least one storage device, such as a CD-ROM. Each station has a processor responsive to a data file system and to a separate Application program. The data file system includes at least one database file, each comprising data corresponding to a respective software product.

The processor, responsive to the Application program, receives the data from the database file that corresponds to a user selected software product, requests a decryption key from a remote network server based at least on the user selected software product data from the database files, and processes the requested decryption key that is selectively received from the server for decrypting the selected software product from the storage device.

In another embodiment, an end-user station is coupled to at least one storage device, such as a CD-ROM, where each station has unique serial number and a processor that is responsive to an Application program stored therein. The user can select a software product to decrypt upon receipt of a corresponding decryption key.

A remote vendor station, having a unique password, is selectively coupled to the end-user station, via a network, to receive a request for the decryption key corresponding to the selected software product. Further, the vendor station receives the serial number from the end-user station.

A remote server is connected to the vendor station, via a network, when the password transmitted from the vendor station is validated. The server receives a request for the decryption key corresponding to the transmitted selected software product and the end-user serial number. The server then generates and transmits the decryption key to the vendor station based on the selected software product and the serial number. Thereafter, the vendor station transmits the decryption key to the end user station, so that the end-user Application program can decrypt the selected software product based on the received decryption key.

In yet another embodiment, each user station (vendor or consumer) is coupled to at least one storage device, such as a CD-ROM, having at least one electronic database file stored therein. At least one of the database files stores numerous decryption keys, each key corresponding to decrypting a predetermined data portion of the secured electronic information.

Further, a metering device is coupled to each user station. When the metering device is valid, each respective user station is able to retrieve decryption keys from the corresponding database file for use in decrypting the corresponding selected data portion. In addition, a server that is selectably connected to each user station across a network controls whether the metering device is valid and operable so as to permit or deny the user station to retrieve the corresponding decryption keys.

BRIEF DESCRIPTION OF THE DRAWING

The following detailed description, given by way of example and not intended to limit the present invention solely thereto, will best be understood in conjunction with the accompanying drawings in which.

DETAILED DESCRIPTION OF THE INVENTION

The preferred embodiments of the present invention all relate to a system where a retailer or a consumer may access software products from a storage device, such as a CD-ROM, that is coupled to the retailer or consumer user station or computer. Each software product on, e.g., a CD-ROM, has been secured by an encryption technique so that the retailer or consumer may access any encrypted software product upon receipt of a decryption key.

For example, in one embodiment, every time the retailer or consumer wants to decrypt a software product, the retailer or consumer user station must link up with a remote server. The server will first ascertain that the station may access such decryption keys through, e.g., passwords and external serial numbers. Once the connection is validated, the server may generate the desired decryption key, based on, e.g., the software product item number, an internal serial number (not known to the retailer or consumer) and a purchase code.

For added security, the decryption key generated by the server is preferably only a partial decryption key. Thus, if the decryption key required to unlock an encrypted product is 56 bits long, a partial key may simply be a portion thereof. The retailer or consumer user station, having an Application program, generates the full 56 bit decryption key. If the station is a retailer station, the retailer typically will decrypt and write a product onto an end-user media of choice, such as a floppy disk.

In another embodiment, the retailer or consumer user station has a metering device or "dongle" attached thereto for monitoring and selectively preventing access to decryption keys that are stored, not in a remote server, but in a known path to the Application in each station. In this case, the dongle will only permit a predetermined amount of products to be decrypted, an unlimited amount of products but for a predetermined amount of time, a predetermined monetary amount, or any other preset criteria. Once the preset criteria has expired, the retailer or consumer must link up with the remote server for revalidation.

Figure 1:
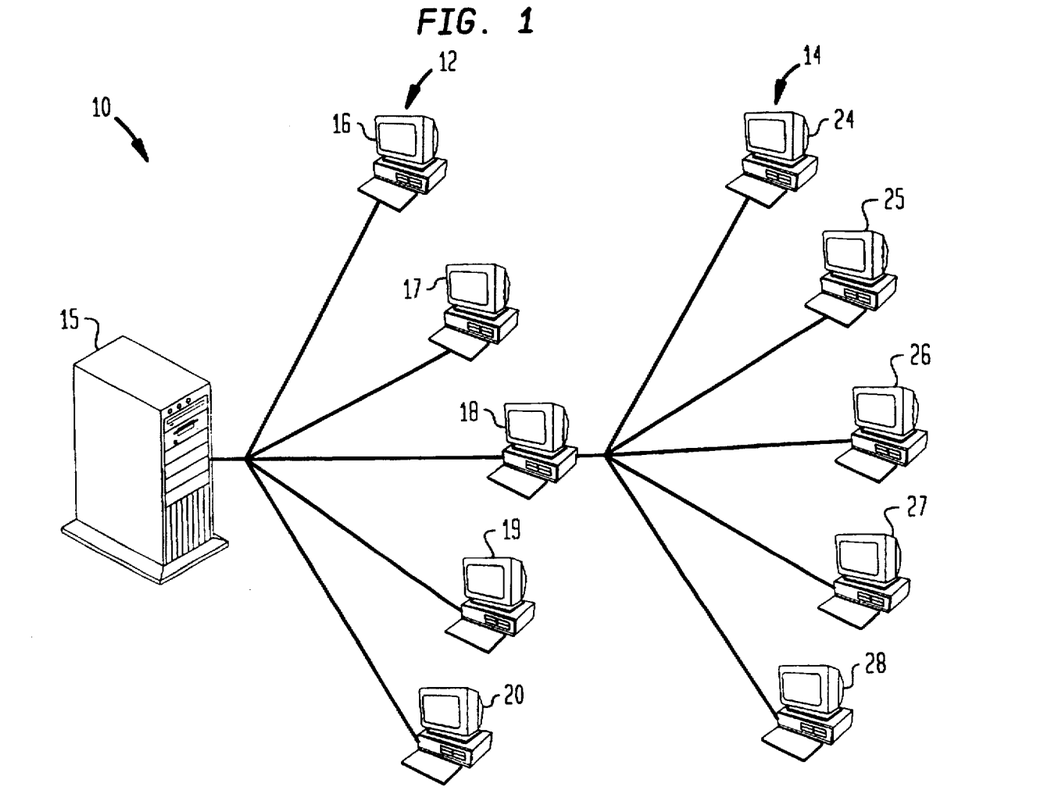
FIG. 1 is a diagram schematically illustrating a three-tier network having a server connected to a first group of user stations, where a station in the first group is connected to a second group of user stations, in accordance with the present invention.

As seen in FIG. 1, a network 10 is illustrated having a server 15 that may be directly connected to a plurality of stations 16, 17, 18, 19 and 20 of first station group 12. Server 15 may be a conventional computer having PC DOS or Windows®, Macintosh®, UNIX or other OS (operating system) platform or a specialized server such as an exemplary Sun® Server. Server 15 may be connected to any station in station group 12, and vice-versa, by, for example, a typical modem link or LAN/WAN connection. A station may also be a conventional computer having any platform. Although only five stations in station group 12 are shown, it should be understood that there is substantially no limit to the amount of stations connected to server 15.

FIG. 1 also shows a second station group 14 that includes stations 24, 25, 26, 27 and 28. As with station group 12, additional stations can be added to group 14. As shown, station 17 may be connected to each station in group 14. Additionally, every station in first station group 12 may be connected to stations in second station group 14 or other station groups (not shown). Further, stations from the first station group may communicate with stations from the second station group, and vice versa, without being physically connected via a modem link or LAN, but by facsimile machines and the like, external to each station.

Figure 2:
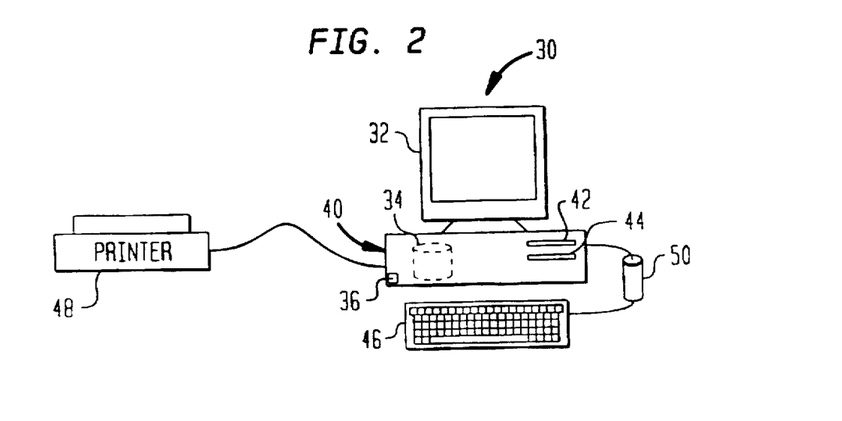
FIG. 2 shows an example of a user station of FIG. 1, in accordance with the present invention.

As stated, stations 16–20 and 24–28 are typical computer systems, preferably PC or Macintosh® based. FIG. 2 illustrates a conventional computer station which includes a computer housing 40, a monitor 32 and a keyboard 46. Housing 40 comprises a modem jack 36, a hard drive 34, a floppy disk drive 42 and a CD-ROM drive 44. Of course, a station may include additional or less hardware as desired. Connecting housing 40 with keyboard 46 is a metering device or dongle 50 which, as will be described hereinlater, may prevent a station user from decrypting secured data from a storage device, such as a CD-ROM. It should be noted that the dongle may be connected to any external or internal station port (not shown), as well. A printer 48 may also be included for printing out, among other things, software manuals and disk labels.

Prior to decrypting any software products, each station preferably has specialized software for installing an Application program and a data file system, such as a directory, although the directory may be included in the Application program, if desired. The directory includes separate database or resource files and universal files. In short, the database/resource files include each software manufacturers or foundries name and corresponding software product name, so that when the Application program is launched, the station will dynamically build menus that include each manufacturer and a list of each corresponding software product. Further, the database files include trademark information for each manufacturer, and the correct path for each software product, i.e. on which CD-ROM. Since the database files are preferably separate from the Application program (although the Application program retrieves the data from the database files), it is relatively easy to upgrade or limit the amount of manufacturers available on each station.

The universal files in the directory link together necessary products that are required for each selected manufacturer product. For example, if a user selects a software product from a specific manufacturer, three additional products may need to be retrieved for the selected product to work. Also, depending on the platform of the station (PC, Macintosh, etc.) certain programs must be linked with the selected product. For example, if the station has a Macintosh platform and requires a specific utility to run the selected software product The Application program performs the majority of the functions for the station when decrypting software products. Among its functions are dynamically building manufacturer and software item menus, linking with the server or other stations, generating full decryption keys from partial keys, accessing the selected software product from one of a plurality of CD-ROMs, performing the decryption algorithms of the selected products for storage on, e.g. the hard drive or a floppy disk (or any high density storage medium), and queuing an attached printer to print out software manuals, labels for the floppy disks, and the like.

The software products, stored on the CD-ROMs, are preferably encrypted in the following manner. Each unsecured product is first encrypted by a conventional encrypting process using a unique corresponding encryption key. Thereafter, each encrypted product is decrypted using a unique phantom key. A phantom key is any random key so long as it is not the same as the unique encryption key. Each phantom decrypted product is then written to a corresponding CD-ROM. This scheme of first encrypting and then decrypting with a phantom key ensures that the software products on the CD-ROMs are virtually unbreakable without having both the phantom key and the encryption key. It has been estimated that it would take a Cray supercomputer approximately five years of non-stop processing to break the key codes for each software product. Of course, any encryption scheme will work with this invention as well.

FIGS. 3A–D is a flow chart showing the steps for decrypting selected software products from a plurality of CD-ROMs from a retailer or consumer station (in station group 12), where a partial decryption key, for each selected product, is generated from the remote server.

Figure 3A:
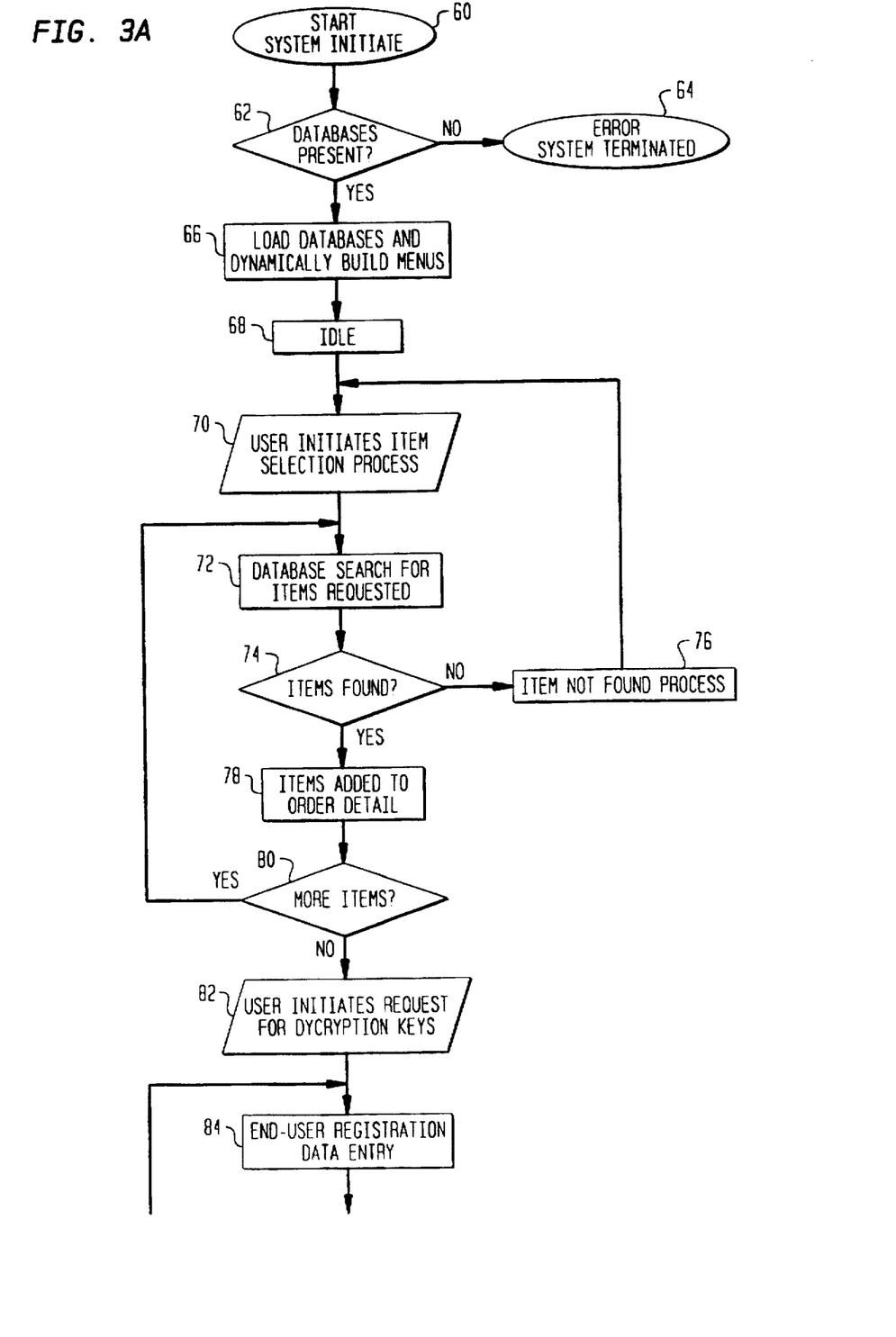
FIGS. 3A–3D is a flow chart showing the steps for decrypting selected software products from one of a plurality of CD-ROMs connected to a user station from the first group of stations, in accordance with the present invention.

At step 60, the retailer or consumer user station is powered on and the Application program is launched. For example, on a Windows based operating system, the user would "click-on" the Application icon. At step 62, once the Application is launched, it checks that all of the necessary files from the directory are present. If not, an error message is flashed on the monitor and, upon user Reconfirmation, the Application is terminated at step 64. Assuming that all files are present, at step 66, the Application will read the available database files and include the contents of these files in dynamically built menus. An example of a dynamically built menu would be a list of manufacturer and corresponding product menus.

At step 68, the station is idle while it waits for a user input. At step 70, the user will select the software product item or items that need to be decrypted and optionally written on a storage device. The user may select the desired item via SKU numbers, actual product names, scrolling lists or other criteria depending on the product. At step 72, the Application searches in the database files for the selected item. If, however, the item was selected from a scrolling list (a list created from the menus built from the database files), then the user selected an item directly from the database and therefore, a search is not necessary. Step 74 indicates that the selected items were found. If not, step 76 will alert the user and return to step 70.

Assuming that the item is found, the selected item will be added to an Order Detail screen that includes other selected items, if any, at step 78. In the Order Detail screen, the user can select some or all of the selected items for decrypting and manufacture. Step 80 inquires if the user wants to select more product items. If yes, then the user returns to step 72, while if no, the user initiates the request for decryption keys to decrypt each selected item, at step 82, by, e.g., clicking a Request icon.

Figure 3B:
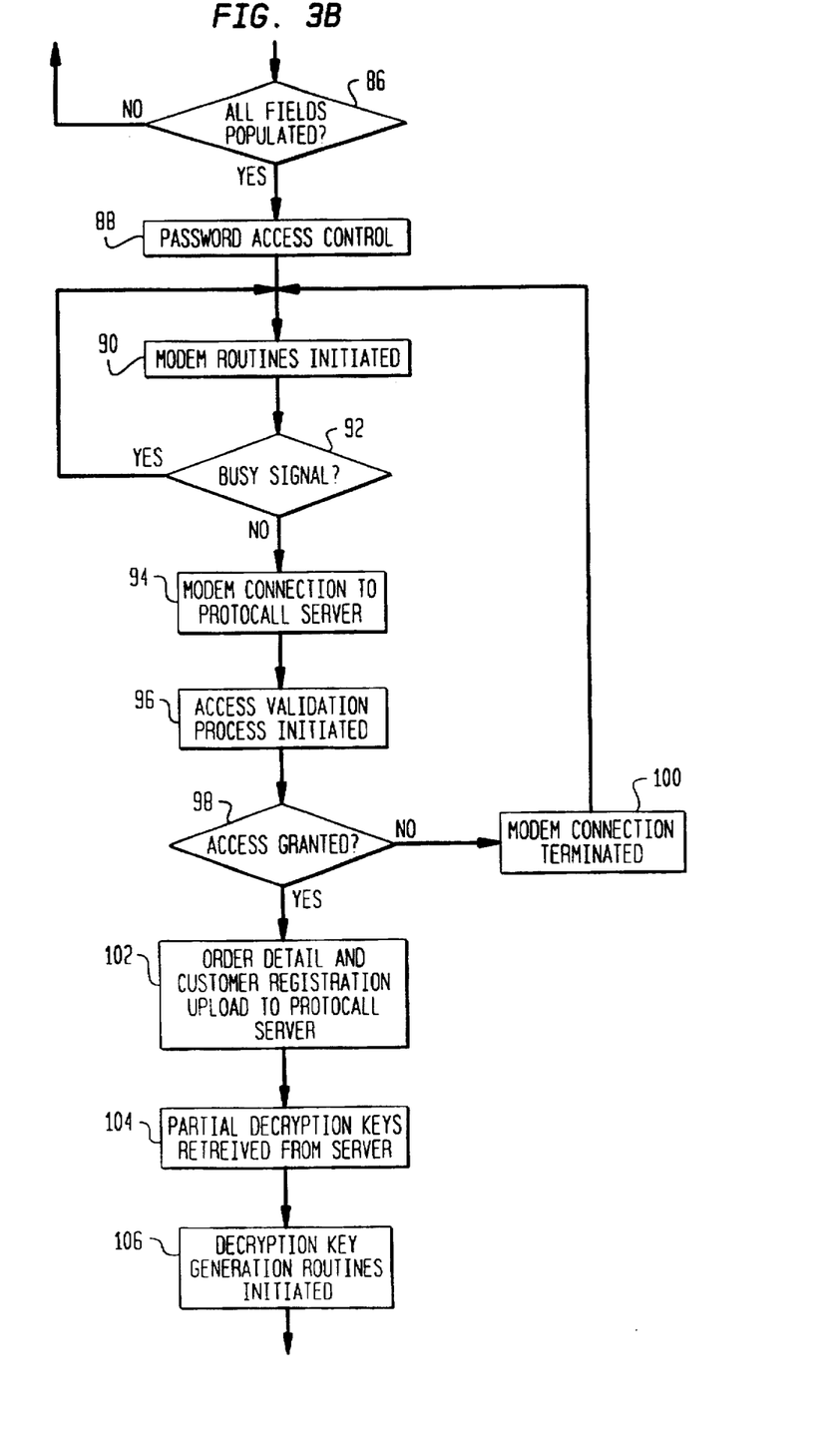

At step 84, a registration data entry screen that includes a space to enter in the customer's name, address, and the like appears. This feature enables the retailer or the consumer himself to register the user of the selected software product with the manufacturer, so that the user can receive additional information regarding updates, etc. Further, this enables the retailer to build a customer database of software purchasers simultaneously. At step 86, the Application ensures that all fields in the registration data entry are populated. If not, the user optionally is returned to step 84.

At step 88, the Application will request the station user's name and a pre-assigned password which will be subsequently transmitted to the server at step 90. At this step, the Application will preferably automatically dial a predetermined phone number to connect to the remote server. To avoid anticipated traffic of several stations trying to connect to the server simultaneously, conventional network solutions can be implemented if a server is on a LAN.

At step 92, in the event of a busy signal, the Application will continue dialing periodically until a connection is made or the user terminates the process. At step 94, connection to the server is made. At step 96, the server will initiate a series of requests for data to determine if the station is qualified to "Login" to the server. Some of the criteria include the station name, a password, and the external serial number.

At step 98, if access to the server is denied, the modem connection is terminated by, e.g., an ATF command, at step 100. If access is granted, step 102 transfers the Order Detail and registration data entry information to the server. The server may store this information for future billing and royalty reporting purposes. Further, in this step, the product item number, the external serial number, and a purchase code, among others, is supplied to the server. The purchase code is a code generated by the Application that is not dependent on the selected product item but based on the internal serial number of the Application. Based upon the supplied information, the server generates partial decryption keys to be transmitted to the requesting station.

At step 104, the partial decryption keys are transmitted transparently to the Application via the modem. This partial decryption key is invisible to the user and is only used internally to generate the full decryption keys in step 106. At step 106, the Application generates the full decryption keys that will decrypt the selected software product. This is achieved, e.g., by using a private key encryption/decryption scheme. The full decryption keys are preferably 56 bit keys using the multi-level encryption scheme previously discussed. For example, since only portions of the decryption keys are sent, there is little risk of a security breach since the balance of the decryption key that needs to be used is calculated "on-the-fly" by the Application.

Figure 3C:
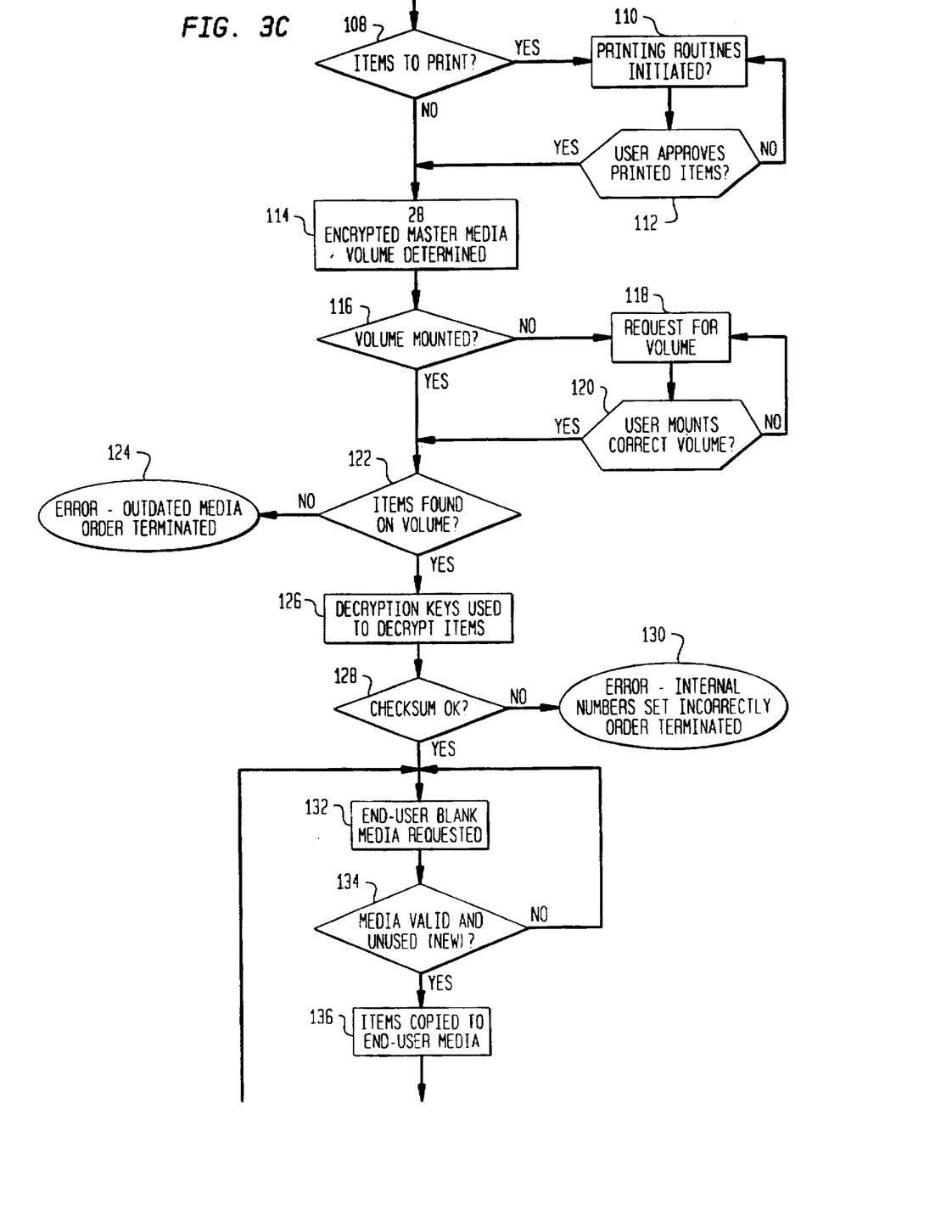

At step 108, the Application queries whether there are any items to print. That is, if the product requires labels or documentation, the Application will generate these documents locally at the station's printer. The labels are for the floppy disks and casing which will be manufactured, if desired, for the decrypted software products. The labels and documentation may or may not be encrypted in the database or CD-ROM, depending on the manufacturer's specifications. If there are items to print, the printing routines are initialized at step 110. Once the items are printed, the user will have the opportunity to check the documents for printing flaws, at step 112, and if necessary reprint the documentation back at step 110. If the documentation is error free, or if the user chooses not to print any items, the encrypted CD-ROM volume is determined at step 114. The path to the correct CD-ROM that contains the selected encrypted product is stored in the corresponding database file. Preferably, a dialog box will appear requesting that the user mounts the appropriate CD-ROM for the item or items that need processing. In the event that the order contains items that are located on multiple CD-ROMs, the Application will process the first item, then request that a new CD-ROM be mounted, and proceed with processing that item.

At step 116, the Application checks to make sure that the CD-ROM mounted is the correct one. If not, at step 118 the Application requests for the correct CD-ROM and at step 120, the user may change to the correct CD-ROM. If it is still not correct, the process returns to step 118; however, if the CD-ROM is now correct the process proceeds to step 122 where it is determined whether the selected item is found on the corrected CD-ROM. If not, the CD-ROM is likely outdated and an error message will appear which terminates the order.

Once the item is found, the process proceeds to step 126 where the full generated decryption keys are used to decrypt the selected items from the Order Detail. These keys are then immediately discarded by the Application and thus cannot be used again. This occurs since the keys that are generated may only exist one time for a single order. The keys that are generated in the future to decrypt the same item will be completely different. Thus, the full decryption keys are only temporarily stored in a RAM (random access memory) until the item is decrypted and then discarded. At step 128, the decrypted items are checked by the Application in a process called "CheckSum" to insure the integrity of the data. In the event of a CheckSum error, the order will be terminated at step 130. In this case, it is most likely that the internal serial number in the Application has been set incorrectly or that the installation procedures were not correctly followed.

Figure 3D:
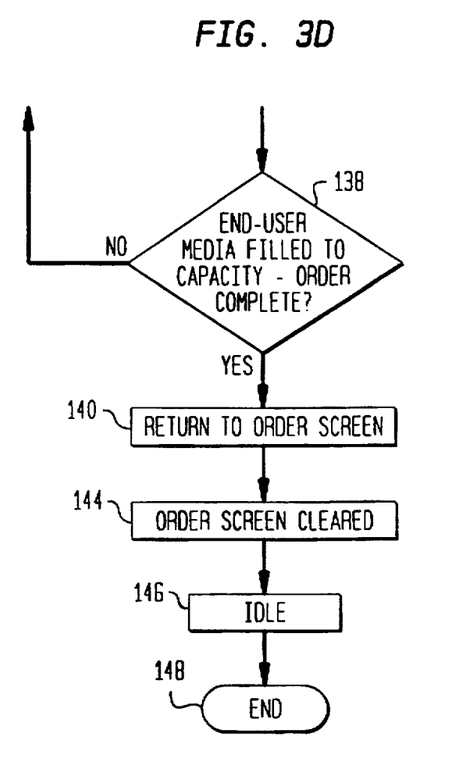

At this point, the selected product item has been decrypted and is temporarily stored in the station memory. If the station user is a consumer, the product may be stored on the hard drive of the station. Alternatively or in addition to, the consumer may also write the decrypted product to a blank floppy disk. On the other hand, if the user station is from a retailer, the product may only be stored temporarily in the RAM as was the decryption key. At step 132, the Application will request a media type to be mounted. Preferably, the media is a floppy disk which is specially serialized. If the Application requires that the floppy disks be specially serialized, then the specialized disks must be supplied to the user since no other media will work with the system. This procedure is to ensure quality control and maintain a control over the amount of products that can be decrypted per retailer and consumer station.

At step 134, the Application determines whether the media are the correct type and formatted for the correct platform. Additionally, the Application "flags" the media once it is mounted so it cannot be used again. If the media does not meet these criteria, the media will be rejected, and a request will be made of the user to mount valid media back at step 132. Assuming that the media is correct, the product items are copied to the media at step 136.

At step 138, the Application determines whether the media is filled to capacity or require decryption from multiple CD-ROMs. If the order is not complete, the process is returned to step 132. If the order is complete, the Application will return to the Order Detail screen at step 140. At step 144, the order screen is cleared and the Application is ready for the next order to be processed through the system. At step 146, the station is idle waiting for the user to initiate the next selected item, if any. Lastly, at step 148, the process is ended.

FIGS. 4A–D is a flow chart showing the steps for a consumer decrypting selected software products from a plurality of CD-ROMs from the consumer station. In this embodiment, the consumer preferably goes through the retailer, where the consumer purchased the software and CD-ROMs, to receive the partial decryption keys, as desired. The retailer, in turn, connects to the server for the partial decryption keys and once received, subsequently transmits on line or by facsimile to the consumer.

Figure 4A:
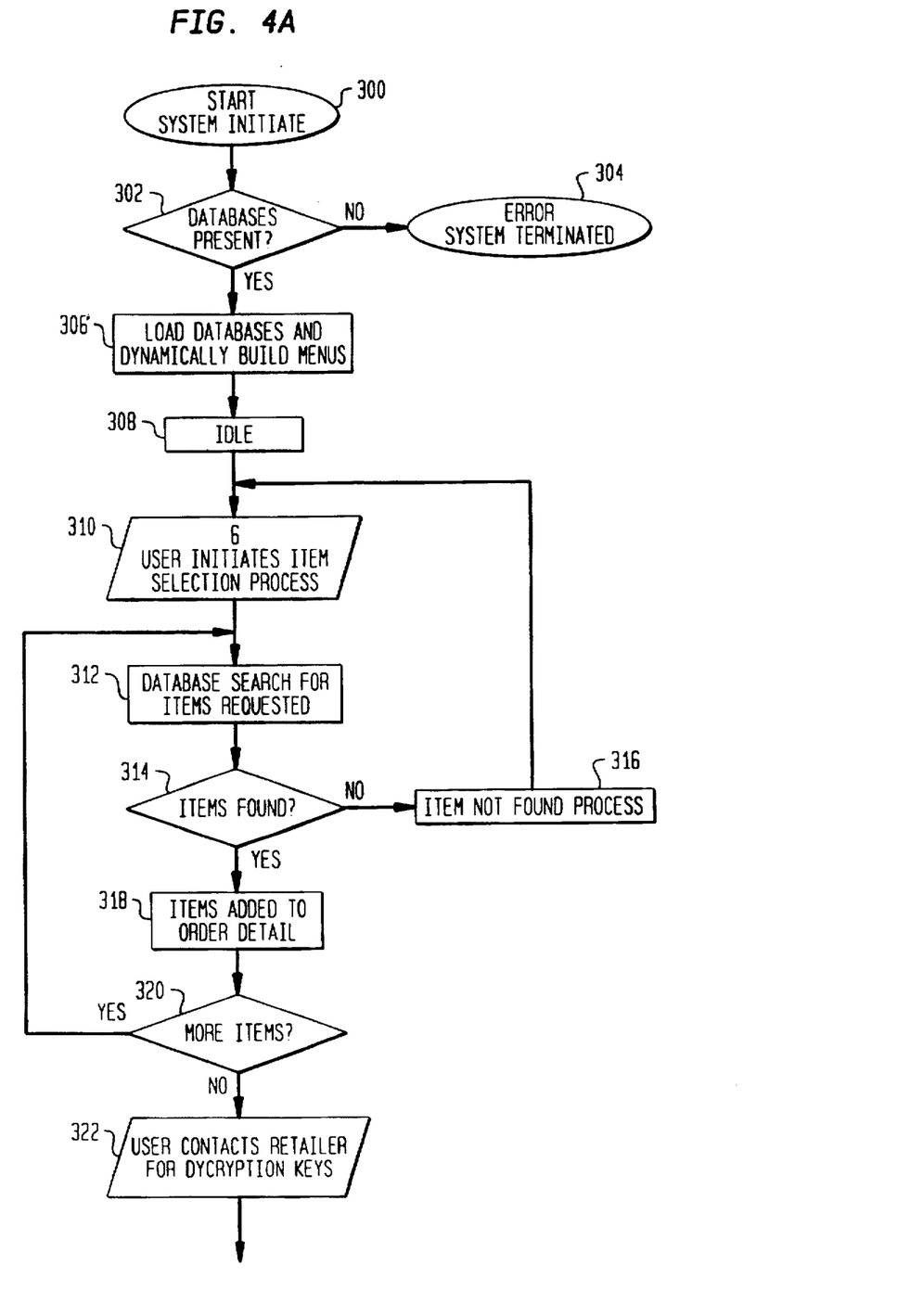
FIGS. 4A–4D is a flow chart showing the steps for decrypting selected software products from one of a plurality of CD-ROMs connected to a user station from the second group of stations, in accordance with the present invention.

Steps 300 to 320 are essentially identical to steps 60 to 80 of FIG. 3A and therefore will not be redescribed. At step 322, the consumer user will contact the retailer, where he purchased the Application program, for the partial decryption keys. The user may contact the retailer by telephone or facsimile to request the partial decryption key for the selected software product, or may contact the retailer via other networks, such as a modem. The information supplied to the retailer include the product item number, the purchase number and an external serial number that was supplied with the Application program. At step 324, the retailer initiates a request for the partial decryption keys from the remote server.

Figure 4B:
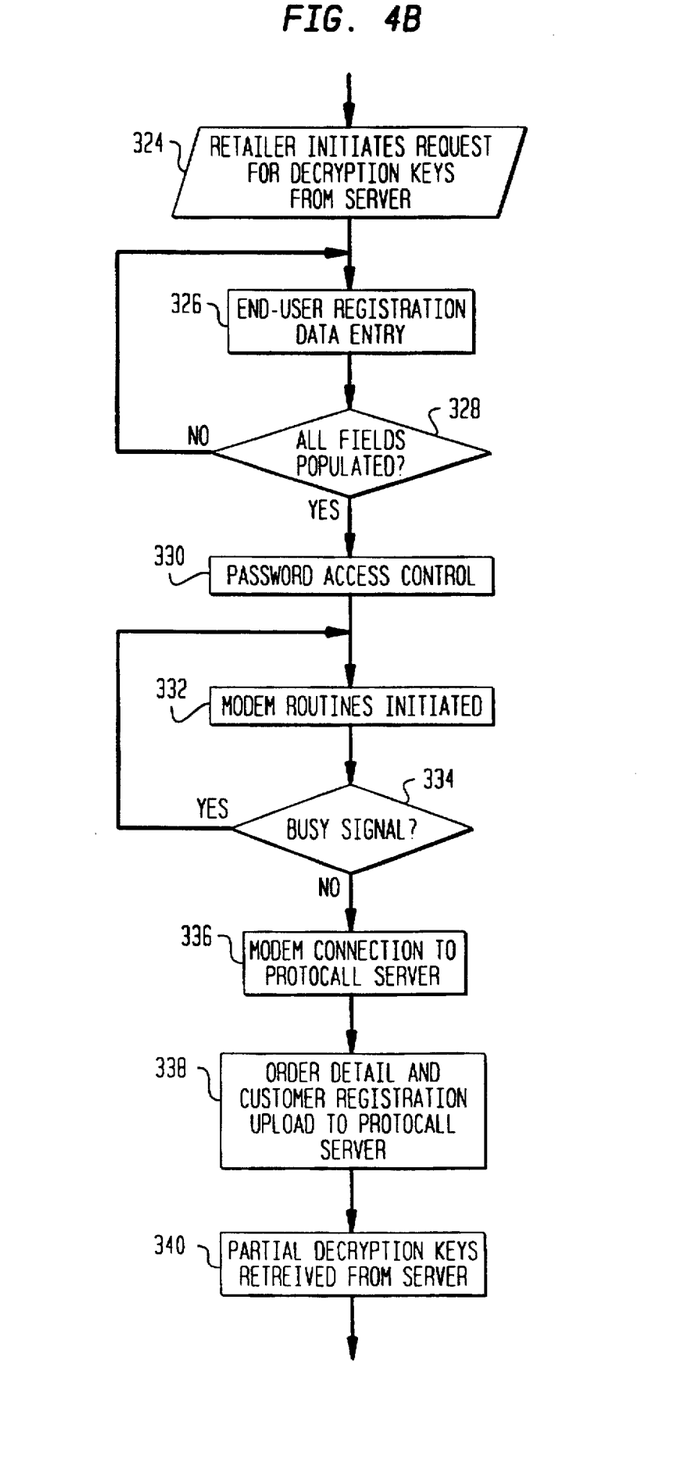
Figure 4C:
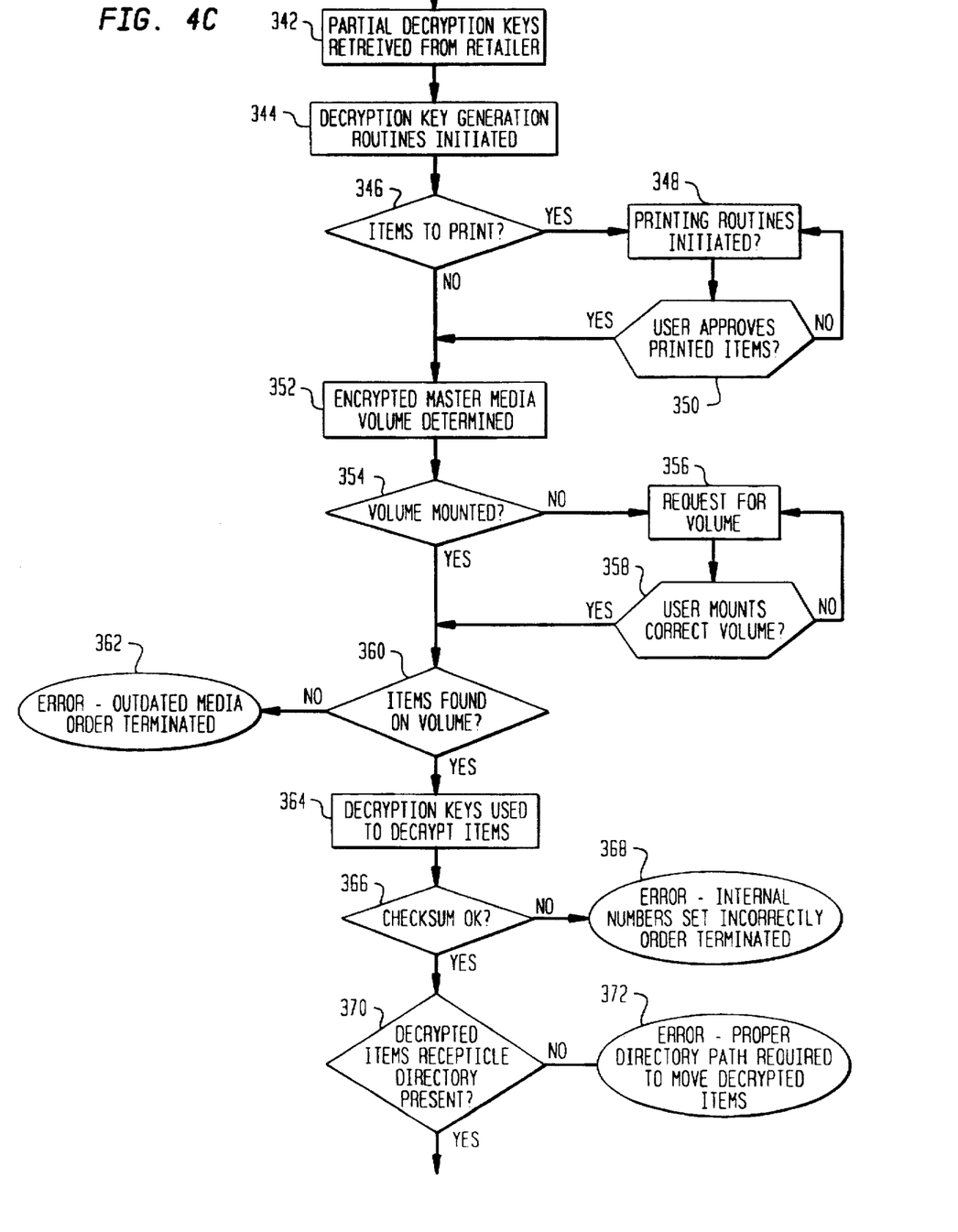
Figure 4D:
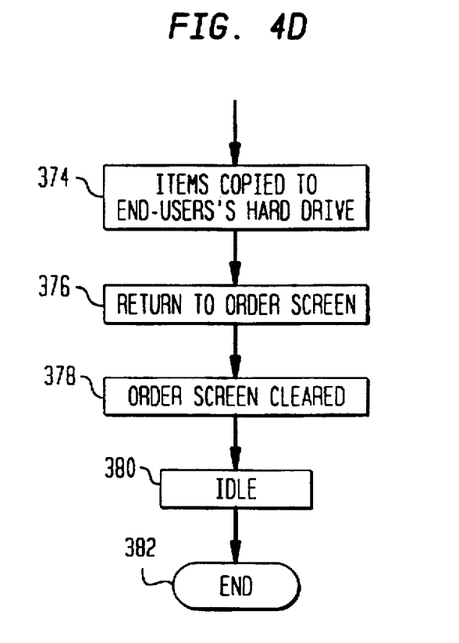

Steps 326 to 340 are substantially the same as steps 84 to 94 and 102 to 104 of FIGS. 3A–B, and therefore will not be redescribed. At step 342, the retailer transmits by modem, facsimile or telephone a partial decryption key, which is preferably 9 bits in length. At step 344, the consumer user enters the 9 bit partial decryption key into the Application to internally generate the full 56 bit decryption key to decrypt the selected product item.

Steps 346 to 368 are essentially the same as steps 108 to 130 of FIG. 3C and therefore will not be redescribed. At step 370, the Application preferably moves the decrypted software product from the CD-ROM to the recepticle directory. If a directory path is not located, an error message will flash so that the user may create a proper directory at step 372. At step 374, the decrypted product items are copied to the directory on the consumer's hard drive. Steps 376 to 382 are essentially the same as steps 140 to 148 of FIG. 3D, and therefore, will not be described.

FIGS. 5A–D is a flow chart showing the steps for decrypting selected software products from a plurality of CD-ROMs from a retailer or consumer station (in station group 12), where the partial decryption keys are generated from the station itself. In this embodiment, a dongle 50 is utilized to monitor the amount of items decrypted, as previously described. The partial decryption keys are located in a "resource" file which is one of the database files in the directory.

Steps 200 to 206 are essentially the same as steps 60 to 66 of FIG. 3A and therefore will not be redescribed. At step 208, the Application verifies that it is set to require a hardware dongle. Further, the Application checks that there is an resource file. If the Application is not set to receive the dongle or if the resource file is not present, then at step 210, the process may proceed to step 68 of FIGS. 3A–D, or else terminate.

Figure 5A:
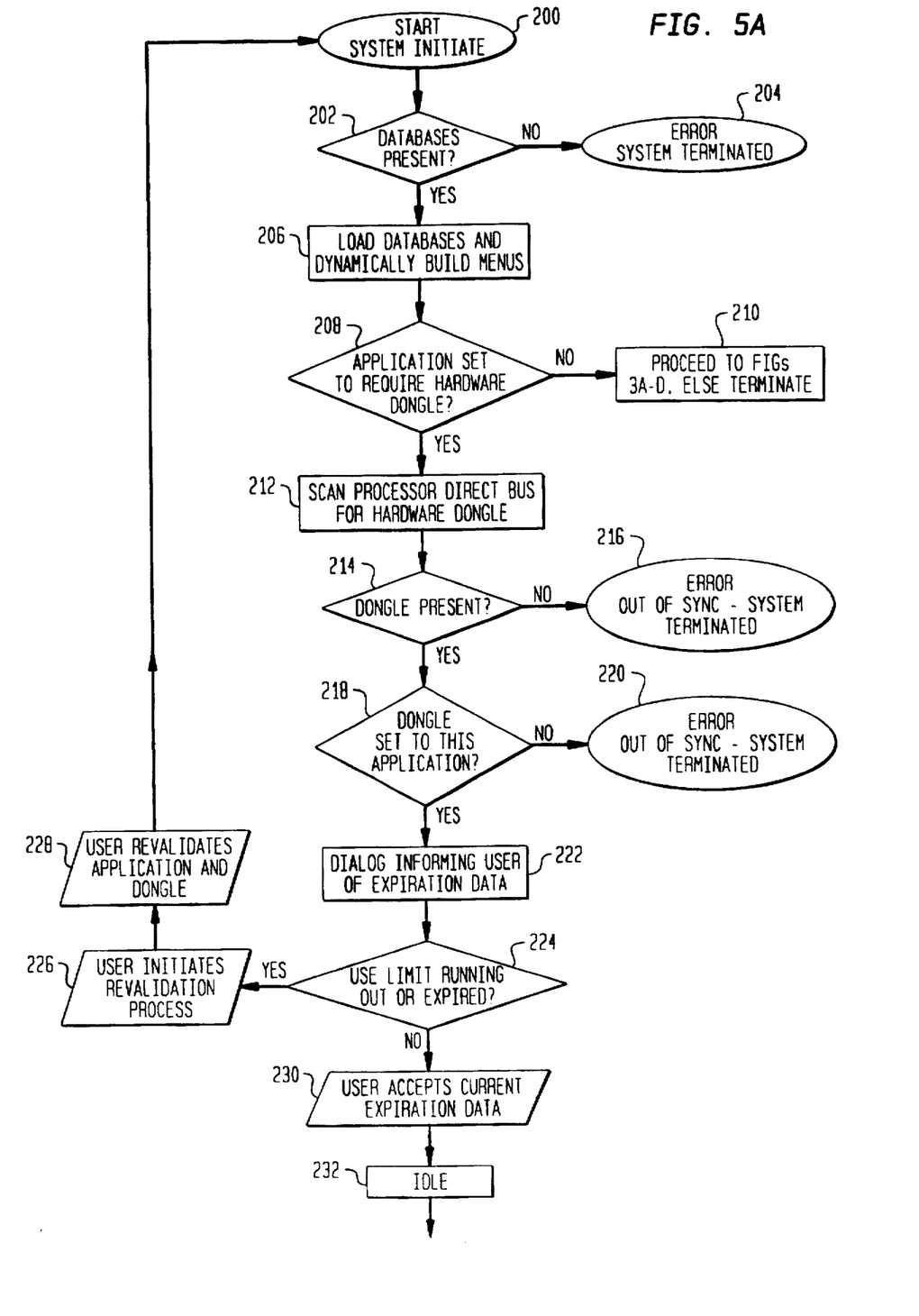
FIGS. 5A–5D is a flow chart showing the steps for decrypting selected software products from one of a plurality of CD-ROMs connected to a user station from the first group of stations having a metering device, in accordance with the present invention.

At step 212, the Application verifies that the bus, preferably a Processor Direct Bus, is connected to the dongle. At step 214, if there is no dongle, an error message is generated and the Application is flagged or terminated, at step 216. At step 218, the Application verifies that the dongle is set specifically for the Application. At step 220, an error message is generated and the Application is terminated if the dongle failed the verification.

Figure 5B:
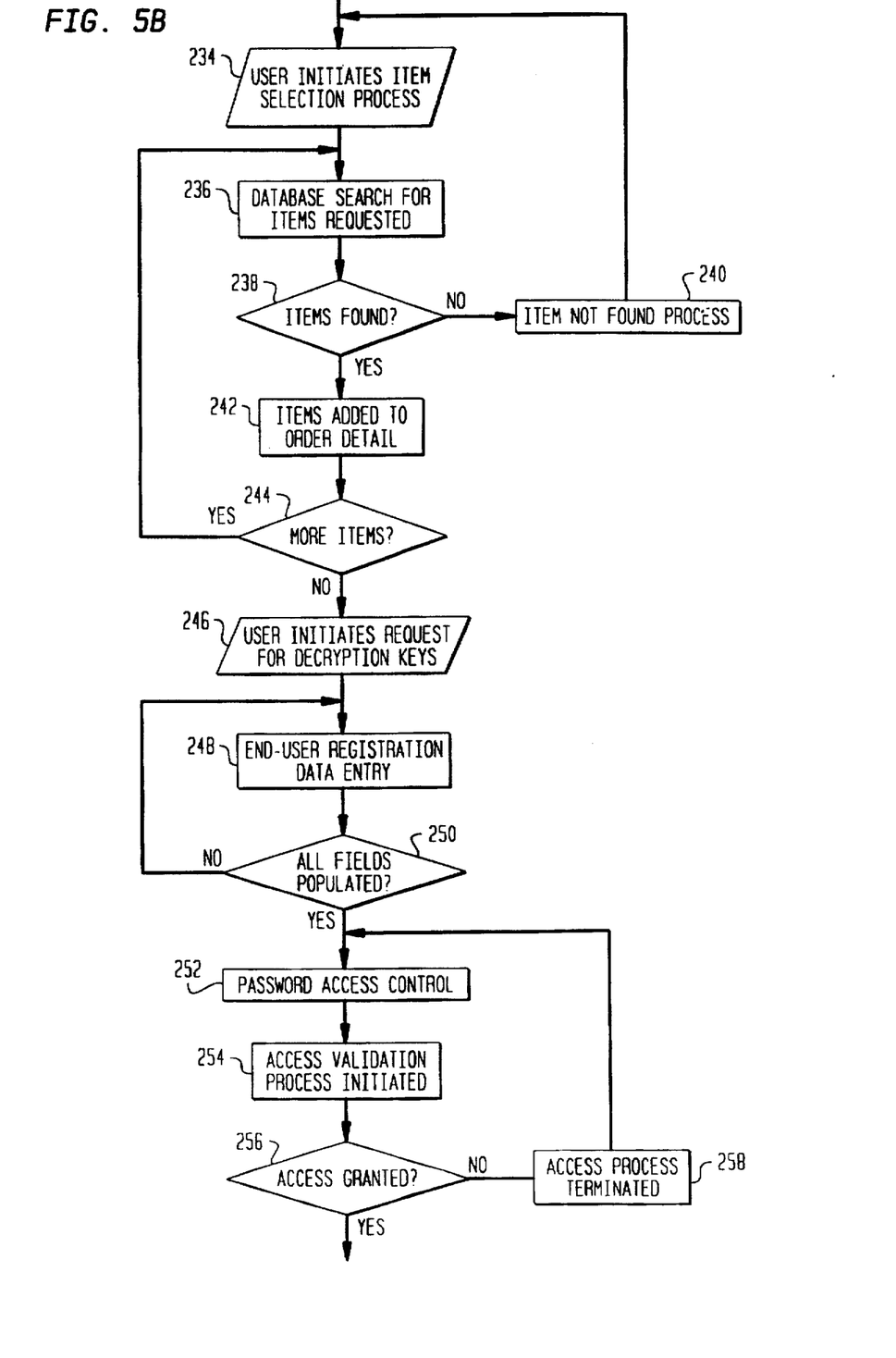

At step 222, a dialog box appears on the monitor informing the user that the dongle has an expiration date approaching in X number of days, in X number of additional manufacturing sessions, by X number of dollars, and/or any other criteria, as desired. At step 224, if either limits are expiring, the user can initiate a revalidation process at step 226. Preferably, the dongle is revalidated on line by the remote server at the server's discretion at step 228. Once the dongle is revalidated the process returns to step 200 and the user may begin again If the use limit was not running out or expired, at step 230 the user may determine that it is premature to initiate the revalidation process and instead elects to proceed with the manufacturing process.

Steps 232 to 252 are essentially the same as steps 68 to 88 of FIGS. 3A–B and therefore will not be redescribed. Additionally, steps 254–258 are essentially the same as steps 96–100 of FIG. 3B and will also not be redescribed.

Figure 5C:
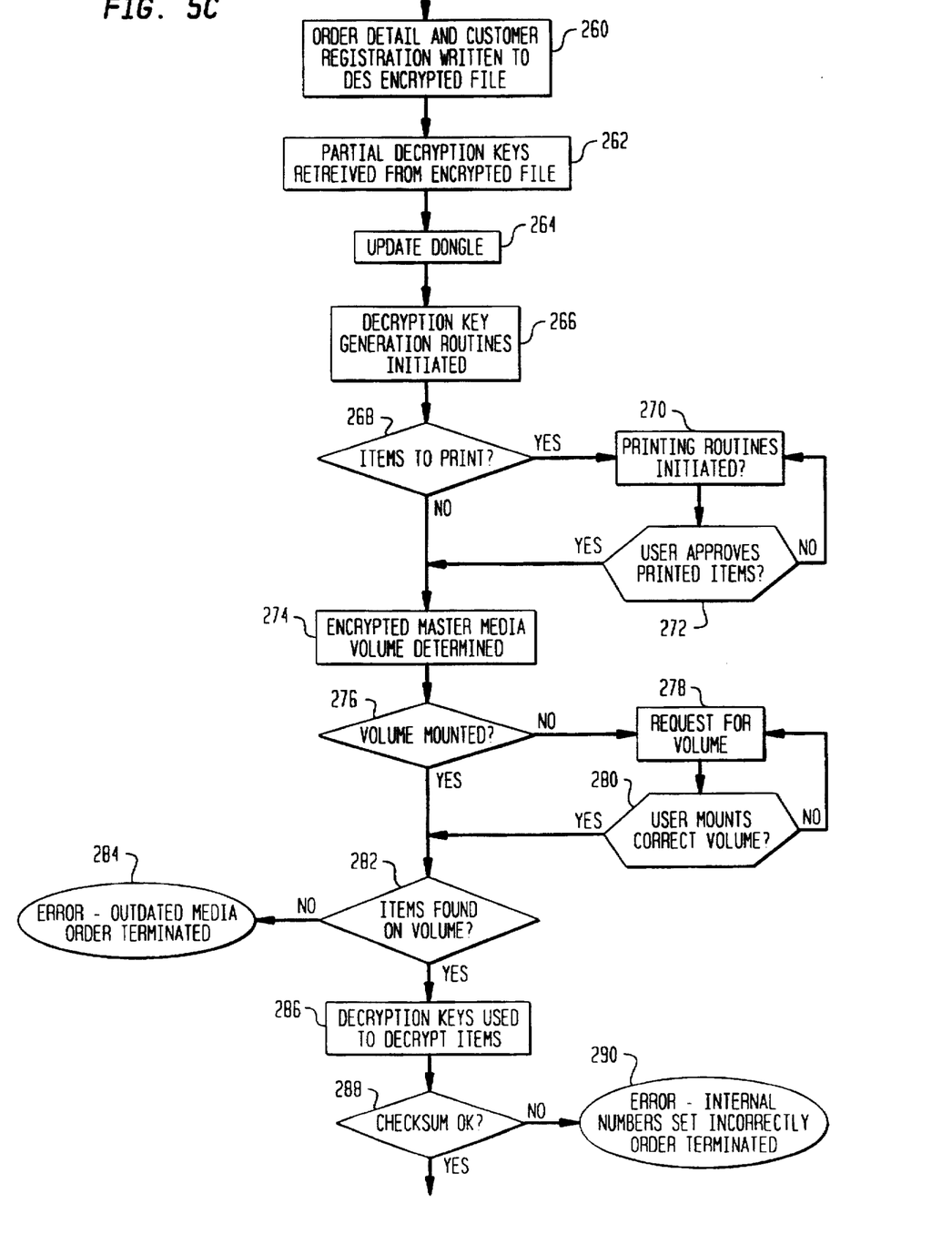
Figure 5D:
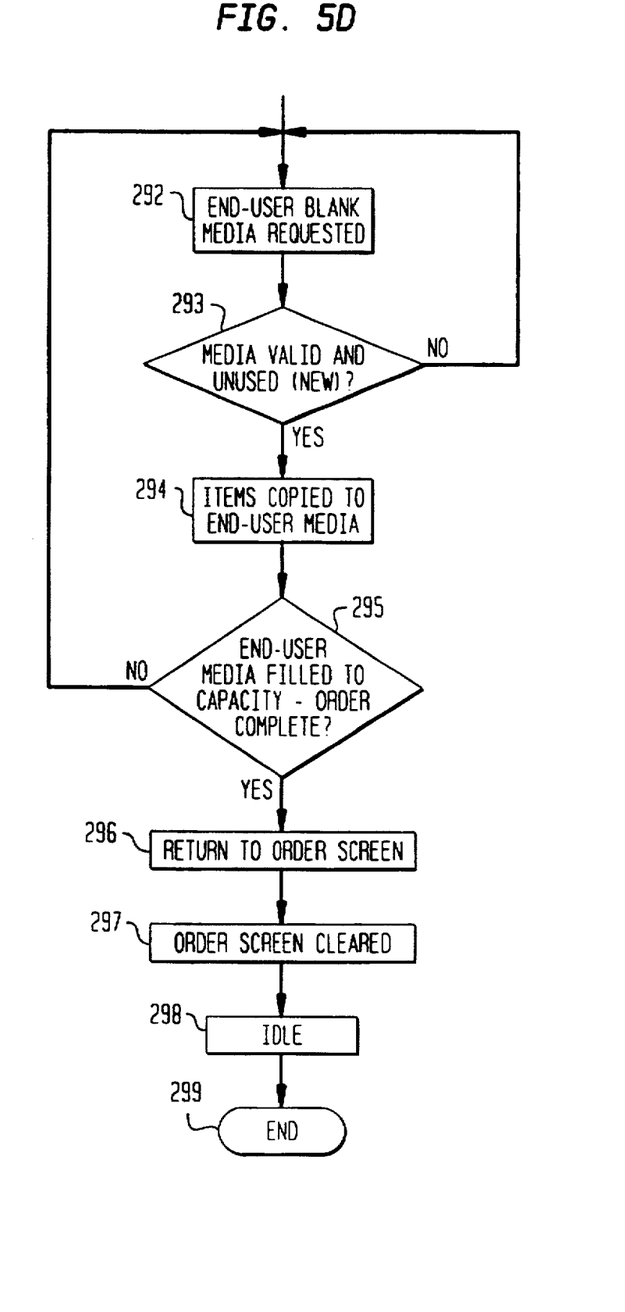

At step 260, in the event that access is granted, the order detail and the customer's registration information will be written to a preferably DES encrypted database file where it will be stored for future billing and royalty reporting purposes. For example, every time that the user goes on line with the server to revalidate the dongle (at step 228) the server will automatically retrieve the data from the DES resource file. At step 262, the partial decryption keys are retrieved from the resource file. At step 264, the dongle is updated indicating that an additional use has procured.

Steps 266 to the end at step 299 are essentially the same as steps 106 to 144 of FIGS. 3B–D and therefore will not be redescribed.

While several embodiments have been chosen to illustrate the invention, it will be understood by those skilled in the art that various changes and modifications can be made herein without departing from the scope of the invention as defined in the appended claims.

The invention claimed is:

1. A system for retrieving a selected one of a plurality of encrypted software products stored in at least one storage device, each of said software products being decryptable by a unique decryption key, comprising:

a end-user station, coupled to said at least one storage device, having unique serial number and a processor responsive to an application program stored therein, wherein a user can select one of said software products to decrypt, each of said software products being decryptable only upon receipt of the corresponding unique decryption key;

a remote vender station, coupled to said end-user station via a network to receive a request for the decryption key corresponding to the selected software product and said serial number from said end-user station, said vender station having a unique password; and a remote server, coupled to said vender station via a network when said password transmitted from said vender station is validated, which receives a request for said decryption key corresponding to the transmitted selected software product and said serial number, said server providing said decryption key to said vender station based on said selected software product and said serial number, wherein said server transmits the provided decryption key to said vender station via said network and subsequently, said vender station transmits said provided decryption key to said end-user station via said network, so that said application program can decrypt said selected software product based on said decryption key.

2. The system of claim 1, wherein each said decryption key that is transmitted to said end-user station is a partial decryption key, and wherein said application program of said end-user station generates a corresponding full decryption key, for decrypting said selected software product from at least one storage device, based on said partial decryption key.

3. The system of claim 2, wherein the generated full decryption key is stored in said user station only until said selected software product is decrypted.

4. The system of claim 2, wherein each said software product being previously encrypted on said at least one storage device by first encrypting each unsecured software product using a unique corresponding encryption key and subsequently decrypting the encrypted software product using a unique phantom key, so that to decrypt each said software product, each said full decryption key must correspond to said unique phantom key to encrypt said software product and to said unique corresponding encryption key to decrypt the phantom encrypted software product.

5. The system of claim 1, wherein the decrypted software product is written to at least one of said internal and external memory store.

6. The system of claim 5, wherein said external memory store is a floppy disk.

7. The system of claim 6, wherein said end-user station verifies that said floppy disk includes a predetermined data code, otherwise said decrypted software product is lost and not written to said floppy disk.

8. The system of claim 1, wherein each of said at least one storage device is a CD-ROM.

9. The system of claim 1, wherein said application program includes an internal identification number that is used to generate a unique purchase number for each said selected software product, such that said purchase number is supplied to said vender station with said serial number, which is subsequently supplied by said vender station to said server to generate said decryption key.

10. A method of retrieving a selected one of a plurality of encrypted software products stored in at least one storage device, each of said software products being decryptable by a unique decryption key, comprising:

selecting one of said software products from said at least one storage device coupled to a end-user station, each of said software products being decryptable only upon receipt of the corresponding unique decryption key, said end-user station includes a unique serial number and a processor responsive to an application program stored therein;

transmitting a first request for the decryption key corresponding to the selected software product and said serial number from said end-user station to a remote vender station having a unique password across a network;

causing a connection between said vender station and a remote server across a network, such that said connection is made only when said password is validated by said server;

transmitting a second request for said decryption key corresponding to the selected software product and said serial number from said vender station to said remote server;

generating said decryption key in said server based on said selected software product and said serial number;

transmitting the generated decryption key from said server to said vender station via said network;

transmitting the received generated decryption key from said vender station to said end-user station via said network, and decrypting said selected software product in said application program of said end-user station based on said decryption key.

11. The method of claim 10, wherein each said decryption key is a partial decryption key.

12. The method of claim 10, further comprising the step of generating a corresponding full decryption key in said application program of said user station, for decrypting said predetermined data portion of said secured information, based on said partial decryption key.

13. The method of claim 12, further comprising the step of storing said full decryption key only until the selected predetermined data portion is decrypted.

14. The method of claim 12, wherein each said predetermined data portion being previously encrypted on said at least one storage device by the steps of:

encrypting each unsecured data portion using a unique corresponding encryption key, and subsequently decrypting each encrypted data portion using a unique phantom key.

15. The method of claim 14, wherein said step of decrypting said selected data portion comprises the steps of:

encrypting said selected data portion based on said unique phantom key, and decrypting the phantom encrypted selected data portion based on said unique corresponding encryption key, wherein said phantom and corresponding encryption key is based on said generated full decryption key.

16. The method of claim 10, further comprising the step of writing the decrypted software product to at least one of an internal and an external memory store.

17. The method of claim 16, wherein said external memory store is a floppy disk.

18. The method of claim 17, further comprises the steps of:

verifying that said floppy disk includes a predetermined data code;

destroying said decrypted software product without writing to said floppy disk if such verification fails, and writing said decrypted software product to said storage medium if such verification passes.

19. The method of claim 10, wherein each of said at least one storage device is a CD-ROM.

20. The method of claim 10, further comprises the steps of:

generating a unique purchase number, for each said selected software product, in said application program based on an internal identification number stored therein, wherein said step of transmitting a second request for said decryption key corresponds to said selected software product, said serial number and said purchase number, and wherein said step of generating said decryption key in said server being based on said selected software product, said serial number and said purchase number.

* * * * *